May 12, 1953 N. P. BORETTI 2,638,182
LUBRICATOR FOR PNEUMATIC TOOLS
Filed Sept. 8, 1950 3 Sheets-Sheet 1

INVENTOR.
Napoleon P. Boretti
BY
Barnes, Kisselle, Laughlin & Raisch
Attorneys.

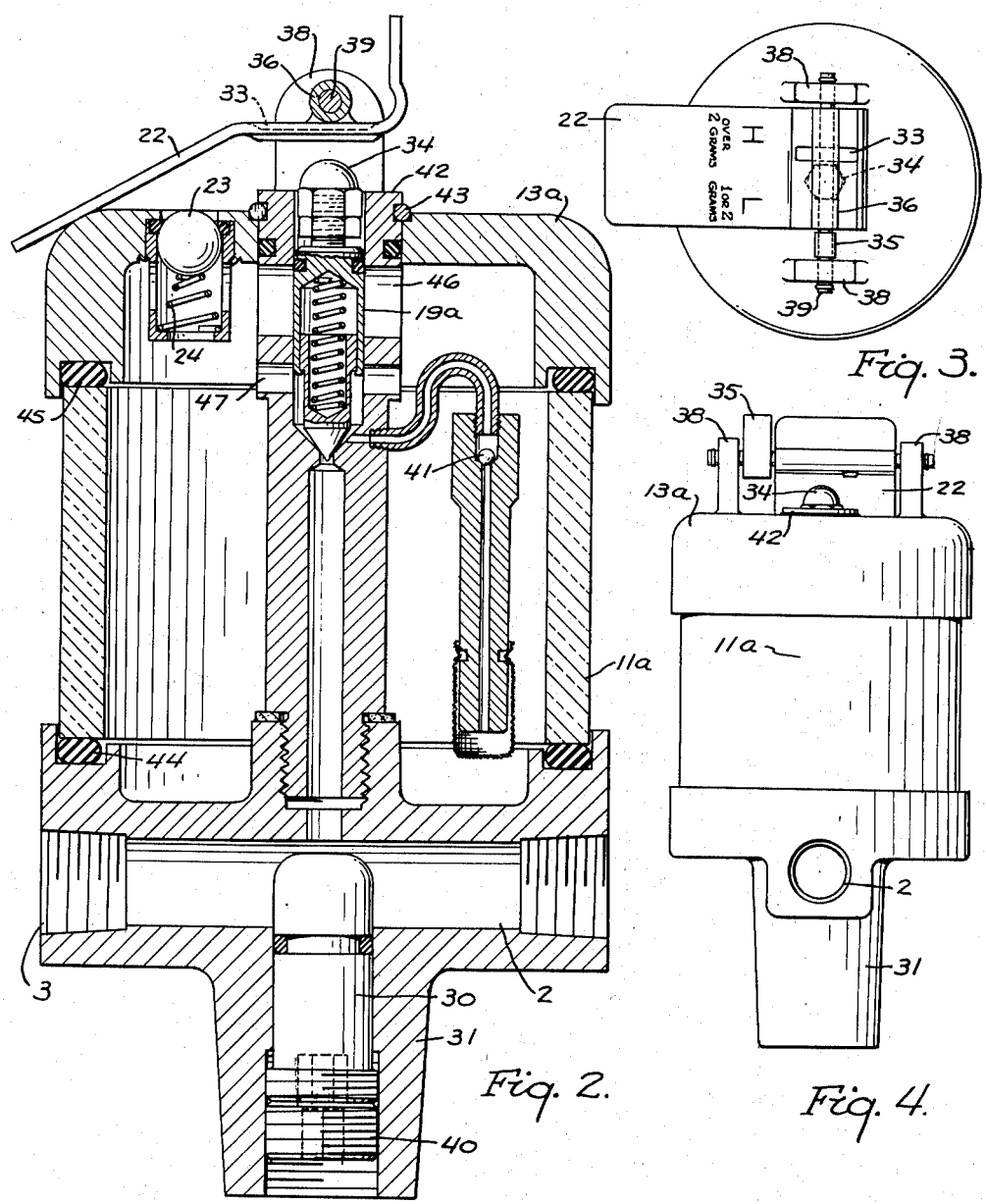

POSITION OF MAXIMUM OIL DELIVERY — POSITION OF MINIMUM OIL DELIVERY, ROTATE COUNTERCLOCKWISE TO INCREASE OIL DELIVERY.

INVENTOR.
Napoleon P. Boretti
BY
Barnes, Kisselle, Laughlin & Raisch,
Attorneys.

Patented May 12, 1953

2,638,182

UNITED STATES PATENT OFFICE 2,638,182

LUBRICATOR FOR PNEUMATIC TOOLS

Napoleon P. Boretti, Detroit, Mich., assignor to General Motors Corporation, Detroit, Mich., a corporation of Delaware Application September 8, 1950, Serial No. 183,767

10 Claims. (Cl. 184—55)

This invention relates to lubricators, especially lubricators for use with tools such as spot welders, which are of the off-and-on pressure variety. These welding guns are usually operated with air pressure to advance the electrodes onto the work and air pressure to separate the electrodes. This means there are two impulses for every welding operation. On the other hand some of the guns may be used with air pressure to bring the electrodes onto the work and springs to separate the electrodes. Here one has only one air shot for each complete welding operation. There are many other tools that may be operated in a plant by the off-and-on variety of air pressure.

It is very difficult to get the proper lubrication to tools of this character as it has been found in operation that with the average tool there is only needed approximately 1/20 of a drop of oil for a single movement of the piston and 2/20 for the movement of the piston outward and return. Experience has shown that about five (5) cubic centimeters of oil will lubricate an ordinary welding gun for six thousand complete operations.

In my U. S. Patent No. 2,524,878, entitled "Lubricator for Pneumatic Tools," issued October 10, 1950, I have described and claimed a lubricator that operates on the principle of utilizing the rush of air into the lubricator to aspirate the oil from a small diameter tube and then utilizing the rushing of the air out of the air chamber above the liquid to carry the oil in suspension in the air or on the walls of the chamber or tube back into the air stream flowing toward the tool.

I have found that it is desirable to properly control, so far as possible, the drop of static pressure in the air line at the lubricator when the valve is opened to operate the piston in the tool. I have found it desirable with a 100# pressure in the line to have, say, the static pressure drop to 85# at the orifice leading into the lubricator. The pressure drop in the line will more or less depend on the tool that is being used and how far away from the lubricator the tool happens to be. In body building, sometimes one pressure line has two or more tools on the line, with only one lubricator. These tools are ordinarily under the control of one operator so that no two tools will be used simultaneously, but in practice it has been found that where more than one tool is on the same line, the pressure drop at the lubricator will not be so great because the branch lines leading to the tools not used and the tools themselves act as accumulators, and the tool being used will draw part of its air supply from these other tools and tool lines. Consequently the pressure drop in the supply line will not be so great. Hence, a lubricator set for giving the proper lubrication for one tool may not give the proper lubrication for several tools on the same line. Furthermore some tools require more lubrication than others, or less lubrication.

I have accordingly designed an improvement over the lubricator described and claimed in my U. S. Patent No. 2,524,878 by providing a means for adjusting the pressure drop at the lubricator, notwithstanding a variety of other conditions calculated to effect the pressure drop at this point.

With this adjustment of the pressure I have also provided a quick method of altering the constriction or size of the Venturi opening in the standpipe leading to the air chamber at the top of the lubricator and this will alter the speed of the air travelling by the mouth of the oil tube, hence will alter the amount of oil drawn out at each movement of the piston in the tool.

A third improvement consists of a new arrangement by which the standpipe tube may be closed by a valve and the pressure relieved in the air chamber above the liquid for a refilling operation. When the lever that operates the valve is lifted and locked in refilling position a separate ball guarded filling opening can be used to pour the oil into the lubricator.

Another feature of the improvement is the use of a ball check valve in the oil conduit in the lubricator for the purpose of maintaining an oil column in this oil pipe for immediate use after aspiration when the pressure variation starts. When the oil level is low the oil does not have to be drawn up through the small diameter pipe each time.

A further feature is the use of this ball check valve in connection with a transparent plastic oil tube so the operator can observe the operation of the lubricator to make sure it is working properly.

Referring to the drawings:

Fig. 2 is a vertical section of a modified form of the lubricator.

Fig. 3 is a plan view of the same.

Fig. 4 is a side elevation of this lubricator.

Figure 1:
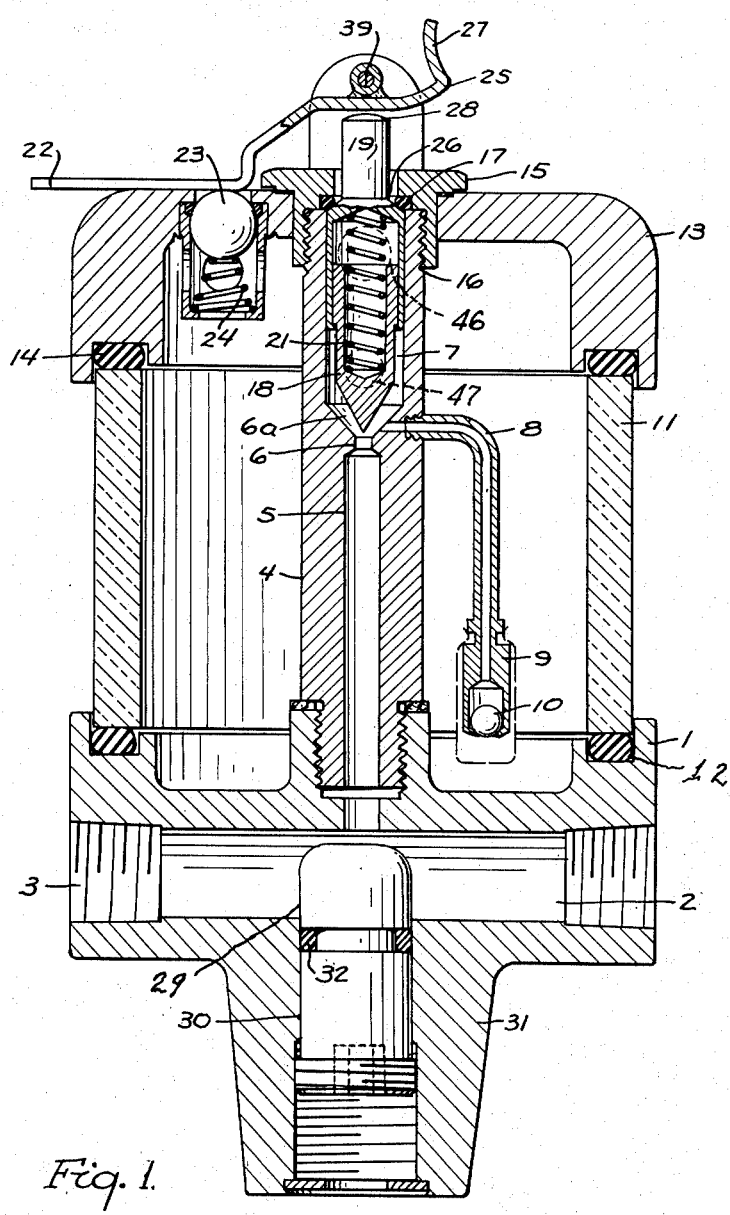
Fig. 1 is a vertical section of the lubricator including a fitting which forms part of the air line to the tool.

Refer to Fig. 1. 1 is a fitting which is a casting provided with a passageway 2 which has at its ends tapered threaded openings 3 for attachment to the air line pipe. Screwed into the upper neck portion of this fitting is a standpipe 4 which has a passageway 5, a constriction 6 and a venturi 6a. The upper portion of the standpipe has a large cylindrical valve chamber 7. Leading into this valve chamber just above the constriction and in the venturi is a small diameter oil pipe 8 which has the lower end formed into the fitting 9 enclosing a ball check valve 10. A glass or plastic cylinder 11 seats at its lower end on the rubber gasket ring 12 and its upper end has a cap 13 pressed down on the O ring 14 by means of the threaded cap screw 15 screwing onto the external threads 16 at the upper end of the standpipe. This tubular cap screw bears down against an O ring 17 to seal the top of the standpipe. The conically pointed valve 18 has telescoped over it in the valve chamber an actuator sleeve and valve 19. The valve chamber has a port 46 leading out to the space above the oil in the reservoir. This port 46 is normally closed by the combined valve and actuating sleeve 19. A port 47 connects valve chamber 7 with the upper portion of the reservoir. A spring 21 tends to separate the actuator 19 and the valve 18. The shoulders of the actuator 19 bear against the O ring 17 to get a sealing effect.

22 is a stamped metal lever which ordinarily covers the check valve 23 which is pressed into closed position by spring 24 to close the refill opening in the lubricator. When the lever is turned sharply upwardly the cam portion 25 pushes down on actuator 19 driving this sleeve together with the spring 21 downwardly and forcing the valve 18 closed. At the same time the shoulders 26 of this sleeve-like valve and actuator get down below the exhaust openings 46 in the side of the lubricator cap and consequently release the pressure in the air chamber above the oil. Now it is possible to insert the spout of an oil can in the refill opening by poking the check valve 23 downwardly with the end of the spout. The lubricator may be thus refilled because the air has been exhausted above the oil and the pressure has been shut off in the standpipe. When the lever is raised sharply to its full upright position the arc surface 27 snaps over the arc surface of the narrowed head 28 of the sleeve valve and actuator and locks the lever in its upright position.

The check valve 10 at the lower end of the oil tube 8 insures the presence of a column of oil in the oil tube at all times so as to be ready and at hand to be drawn into the venturi by the aspirating effect of the changes of pressure.

When the valve in the welding gun (not shown) is opened this presents an outlet for the air in the feed line and, consequently, there will be a momentary drop of the air pressure in the line and also in the oil reservoir. This will carry out air and atomized oil in suspension above the liquid level in the reservoir. The out-rush of air will also carry any oil that has accumulated on the wall of the enlarged chamber 7 in the standpipe 4. When the welding gun electrode has met the work and the pressure again builds up in the gun and in the air line there will be a rush of air through the venturi 6a and this will create a rarified atmosphere at the mouth of the small diameter tube. This will aspirate the oil out of the tube and atomize it, throwing some of it against the wall of the enlarged chamber 7 and some of it will pass out through the ports 47 into the air chamber above the liquid level of the reservoir. When the valve in the air gun is again opened to allow entry of air into the gun to bring the electrodes again in contact with the work, this will momentarily reduce the pressure in the oil reservoir and cause the suspended oil and air to rush back through the venturi, picking up some of the globular oil clinging to the walls of the enlarged chamber 7. This will find its way into the main air stream and then into the welding gun.

The air pressure in the air line 3 and up through the passageway in the standpipe into the air chamber 7 holds the shutoff valve 18 together with the sleeve in the uppermost position. The turned over lower end of the sleeve engaging against the shoulders on the valve 18 serves to retain the valve within the sleeve.

Valve 18 is held in the open position by means of the pressure in the chamber 7 and above the oil. For instance, the pressure in the air line 3 may be 100# per square inch. When the air is released in the welding tool, the pressure drop in the air line may only be from 15# to 25#, so one would still have 75# to 85# in the chamber 7 pushing against the atmospheric pressure which tends to close the valve 18.

As explained in the preamble of the specification, it is desirable to maintain a definite pressure drop at the lubricator in the air line when the tool is operating. I have found that with some tools the pressure drop at the standpipe will be insufficient to cause the proper feeding of oil from the lubricator. Accordingly, I have provided a means to overcome this by introducing into the lubricator an adjustable obstruction plug 30. This has threads that screw into the neck 31 of the fitting. An O packing ring 32 is provided and this obstruction may be completely removed from the air line by screwing the threaded block downwardly, or it may be projected out the desired distance as shown in Fig. 1 to get the desired restriction in the air line. After experimenting, this screw block may be adjusted in the proper position to get the desirable pressure drop which will afford the proper oil feed from the lubricator at each operation.

As explained in the preamble, sometimes several tools are placed on an air line lubricated by one lubricator. In this case the pressure drop will be considerably cut because the branch lines and the tools afford reservoirs of compressed air or accumulators and the tool in use may draw on these as well as the air feed line. Consequently the pressure drop at the lubricator will be insufficient to properly operate the lubricator. I have a very simple way to meet this situation by reducing the constriction in the standpipe or the venturi. Refer to Fig. 2. Note that the lever 22 is provided with a pressed out portion 33. When operating with only one or two tools on one line and one lubricator, this depression is located in an inoperative position as shown in Fig. 3. It is not above the head 34 of the actuator. It is kept in this inoperative position by the spring clip 35 between the knuckle 36 and the uprights 37 and 38 which journal the shaft 39 on which the lever turns. This spring clip can be easily pulled off the shaft by hand and then the knuckle and the lever shifted endwise of the shaft 39 and the clip placed on the other end of the knuckle. This will bring the depressed portion 33 above the head 34 of the valve and consequently the valve and valve actuator and shut-off valve 18 cannot open so far from the Venturi opening. Consequently the restriction will cause greater speed for the air going into the air chamber and greater speed for the air being pulled out of the air chamber, and thereby increase the aspirating effect and thereby increase the feed of oil from the oil tube. This adjustment of the restriction in the standpipe can be worked along with the adjustment of the screw plug in the air line. It is desirable to have a guard plug 40 threaded in the end of the neck 31, see Fig. 2, to cover up the adjusting block 30 so some inexperienced person will not undertake to put a screw driver to the adjusting block and alter the oil feed to the detriment of the tools on the line. This guard plug can be unscrewed only with a special wrench such as the correct size of "Allen" wrench.

In the preferred form of my invention shown in Fig. 2, most of the oil tube is in the form of a transparent plastic tube section. The upper end has a ball check valve and cage 41. The operation of this check can be seen through the glass or plastic cylinder 11a, hence the operation of the lubricator checked. The ball in this upper position will hold a full column of oil because it does not allow the air pressure to get on top of the column below the ball and drive the oil down. The standpipe 42 in this form of the invention extends clear to the top of the lubricator and the glass or plastic cylinder 11a and the cover 13a together with the O rings 44 and 45 are pressed down and held in place by the split spring ring 43. The standpipe 42 has opening 46 to allow the air pressure to escape to the atmosphere when valve and actuator 19a is pushed down and opening 47 connects the venturi with the chamber over the oil.

Figure 7:
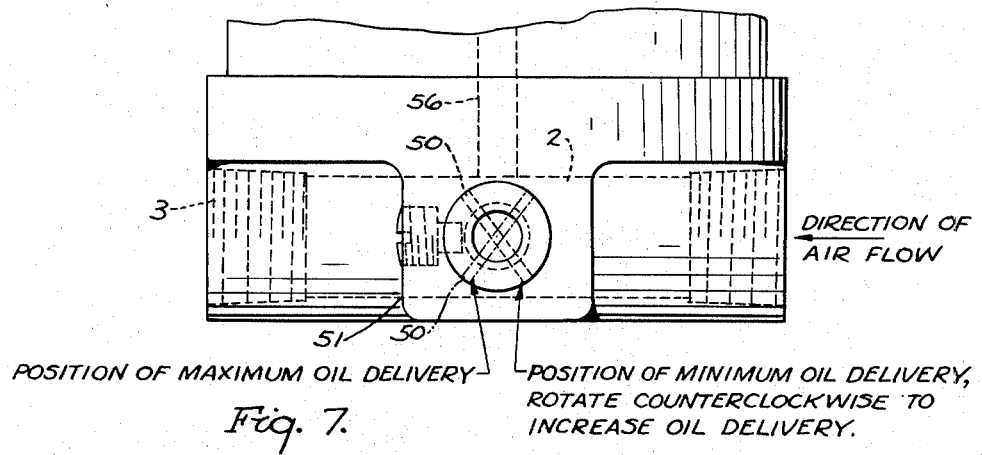
Fig. 7 is a fragmentary view of the lubricator showing this damper valve in place.
Figure 5:
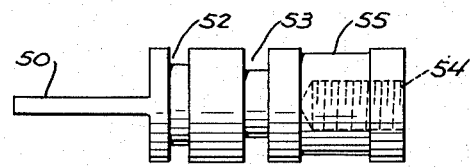
Figs. 5 and 6 are elevational details of a modified form of valve.
Figure 6:
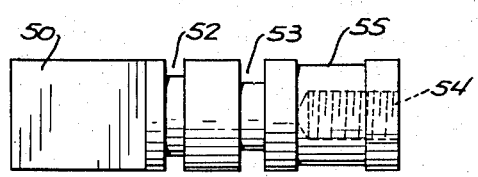

In Figs. 5 to 7 inclusive a damper or butterfly valve 50 is used in place of the screw plug 30 shown in Fig. 2. This damper is journalled in the boss portion 51 in the casting that forms the fitting at the bottom of the reservoir. Projections in the grooves 52 and 53 hold the damper valve in place. The valve may be turned by means of the wrench hole 54 in the valve head 55. In Fig. 7 the damper valve is shown in two positions, one position of maximum oil delivery and the other position of minimum oil delivery. The position of maximum oil delivery is the right hand position where the restriction to the air flow is immediately ahead of the orifice 56 leading into the standpipe. The reason for the greatest effectiveness in this position is that the pressure drop is immediately ahead of the orifice in the line of flow through the air line. When the damper is turned to the left hand position with the top of the damper at the back of the orifice, this is the position of minimum oil delivery because while the restriction is great here the restriction is at the back of the orifice and hence the pressure drop is beyond the orifice and least effective.

I find that all the pressure supply lines in large plants are not always at full capacity. The static pressure at times may drop 25# from the desired pressure level, consequently it needs a very nice adjustment which is afforded by the butterfly valve in order to get the right adjustment so as not to get too much oil in the tool. If the tools are furnished too much oil the excess flies out due to the air pressure and is annoying and dangerous to the workman. With a steady line of static pressure in the supply line the screw block is well adapted to govern the pressure drop at the port into the standpipe, but I find that when the pressure drop is more than 15# at the standpipe orifice, it is difficult to control the oil delivery with the screw plug. This irregular pressure drop in lines not fully supplied with air can be pretty well controlled with the butterfly valve which not only controls the amount of restriction but places the restriction fore or aft the orifice leading to the standpipe. This makes a very nice adjustment and provides the proper oil control even though the pressure drop be more than 15#.

What I claim is:

1. A lubricator for pneumatic tools, particularly tools and machines of the off and on variety wherein a uniform pressure in the air line does not obtain, having in combination an oil reservoir with an air chamber above the oil, a fitting at the bottom of the reservoir containing a section of the air pressure line and an opening in the top thereon, a tubular standpipe secured in air tight relation into the fitting above said opening, said standpipe having a constriction leading to an opening to the air chamber forming a venturi, an oil pipe and fitting leading to the bottom of the reservoir and having an opening into the venturi, a pouring opening and check valve in the top of the reservoir, an actuator and pressure release valve slidable in the top of the reservoir, a shut-off valve springspaced from the actuator and pressure release valve and arranged to shut the venturi when the actuator and pressure release valve is pushed down to open the air chamber to the atmosphere, and means for controlling the actuator and the valve to regulate the size of the Venturi opening.

2. A lubricator for pneumatic tools, particularly tools and machines of the off and on variety wherein a uniform pressure in the air line does not obtain, having in combination an oil reservoir including a fitting at the bottom which includes a passage for becoming part of the air line to the tool or machine and opening to the interior of the reservoir, a standpipe secured to said fitting above the said opening, said standpipe having near its top a venturi leading to an opening in the standpipe to the air chamber above the oil in the reservoir, a valve in the top of the standpipe controlling the venturi, an oil pipe leading from the bottom of the reservoir into the standpipe at the venturi, and a plug adjustable in the fitting adjacent the opening into the standpipe to regulate the pressure drop at this point when the tool or machine is operating.

3. The combination claimed in claim 2 in which the adjustable plug is a screw plug.

4. The combination claimed in claim 3 in which the opening into which the screw plug screws is provided with a screwed-in cover requiring a special wrench to turn the cover out.

5. A lubricator for pneumatic tools, particularly tools and machines of the off and on variety wherein a uniform pressure in the air line does not obtain, having in combination an oil reservoir including a fitting at the bottom which includes a passage for becoming part of the air line to the tool or machine and opening to the interior of the reservoir, a standpipe secured to said fitting above the said opening, said standpipe having a constriction near its top forming a venturi leading to an opening in the standpipe to the air chamber above the oil in the reservoir, a valve in the top of the standpipe controlling a venturi, an oil pipe leading from the bottom of the reservoir into the standpipe at the venturi, and a damper in the fitting swinging across the mouth of the opening in the standpipe to regulate the pressure drop at this point when the tool or machine is operating.

6. A lubricator for pneumatic tools, particularly tools and machines of the off-and-on variety wherein a uniform pressure in the air line does not obtain, having in combination a container having an opening in the top and forming an oil reservoir with an air chamber above the oil, a fitting at the bottom of the reservoir containing a section of air pressure line and an opening in the top thereof, a standpipe secured in airtight relation in the fitting above said opening, said standpipe having a passageway leading from said opening in the fitting to a passageway constriction forming a venturi and a valve chamber above said constricted passageway, said valve chamber having two vertically separated openings to the space above the oil in the reservoir, the lower opening connecting the valve chamber with the space above the oil in the reservoir, an oil pipe line leading from near the bottom of the reservoir to an opening in the standpipe at the venturi, a hollow shutoff valve for the constricted passageway, an actuator slidingly guided in the top of the container including a sleeve in which the valve is guided, the actuator sleeve and the shutoff valve being spring spaced by a spring on the inside of the sleeve and in the hollow of the valve, and the actuator having at the top a narrowed head spaced from the said opening in the top of the container in which it moves, and a lever pivotally supported above the top of the container which can be turned to a position where the end of the lever pushes the actuator down to thereby uncover the upper opening leading from the space above the reservoir into the valve chamber and allow the release of the air pressure around the narrowed head to the atmosphere while at the same time the shutoff valve is pressed down on the constricted passageway to close off the pressure from the air line.

7. The combination claimed in claim 6 in which a second opening is provided in the top of the container and a check valve guarding said opening to act as a filling opening when the said lever has been turned to shut off the pressure from the air line and release the pressure above the oil in the reservoir.

8. The combination claimed in claim 6 in which a pair of uprights on the top of the container support a shaft and the lever is a crooked lever with a bent end or foot with a knuckle that suspends the lever and pivots the lever on the said shaft, the foot of the lever arranged when the lever is turned up into active position to engage and hold the head of the actuator down.

9. The combination claimed in claim 6 in which a pair of uprights on the top support a shaft, a lever pivoted on said shaft by a knuckle, said lever having at one portion a thickened or bossed portion, the said knuckle shiftable along the shaft to bring the bossed portion opposite the actuator head to thereby determine the amount of opening that would be permitted the valve to thereby determine the size of the Venturi opening and the passageway leading through the valve chamber to the space above the oil in the reservoir.

10. The combination claimed in claim 9 in which a spring clip can be slipped over the shaft to hold the lever in position where the thickened portion is at the side of the actuator head and is ineffective on the head or the clip may be moved to the other side of the lever on the shaft to make the boss register with the actuator head and effect a diminishing of the size of the Venturi opening.

NAPOLEON P. BORETTI.

References Cited in the file of this patent
UNITED STATES PATENTS

| Number | Name | Date |
|---|---|---|
| 1,074,867 | Jones | Oct. 7, 1913 |
| 2,524,878 | Boretti | Oct. 10, 1950 |